United States Patent [19]

Seaman

[11] 4,447,288

[45] May 8, 1984

[54] SEAM WELDER FOR THERMOPLASTIC COATED FABRIC

[75] Inventor: Donald R. Seaman, Sarasota, Fla.

[73] Assignee: Seaman Corporation, Millersburg, Ohio

[21] Appl. No.: 403,470

[22] Filed: Jul. 30, 1982

[51] Int. Cl.³ .............................................. B44C 7/00
[52] U.S. Cl. ..................................... 156/574; 156/157; 156/322; 156/497; 156/499; 156/544; 156/579
[58] Field of Search .............. 156/282, 497, 498, 499, 156/82, 157, 320, 322, 304.7, 574, 544, 579, 380.1, 218

[56] References Cited

U.S. PATENT DOCUMENTS 3,402,089  9/1968  Seaman .
3,986,918 10/1976  Berner ................................. 156/497
4,259,142  3/1981  Kortepeter ......................... 156/574

Primary Examiner—Edward C. Kimlin
Assistant Examiner—Timothy W. Heitbrink
Attorney, Agent, or Firm—Renner, Kenner, Greive & Bobak

[57] ABSTRACT

A seam welding machine for thermally seaming edges of coated fabric panels (P and P') in the field, said machine having a guiding head (16) with opposed laterally open overlapping slots (19 and 20) for guiding overlapping panel edge portions into a nip area behind the head (16) wherein the tip (25) of a hot air welding gun is directed, upper and lower pressure rolls (30 and 31) and upper and lower drive belts (34 and 41) following said nip area to press said overlapping edge portions into a seam (S).

15 Claims, 8 Drawing Figures

SEAM WELDER FOR THERMOPLASTIC COATED FABRIC

TECHNICAL FIELD

The invention relates to machines for heat welding seams of flexible thermoplastic membrane by hot air jets, and more particularly to a seam welding machine adapted to join large sheets of flexible thermoplastic membrane in the field over irregular terrain and in adverse weather conditions.

BACKGROUND ART

Flexible membrane linings have been used for many years to provide impermeable ground protection and retain liquids in excavated pits and reservoirs, and to transport water in irrigation ditches.

More recently, such lining systems have been used in the containment of hazardous waste materials and municipal landfills to prevent the leaching of chemicals or waste materials into the ground surfaces, whence they ultimately contaminate public or private water supplies.

Where the linings required are small enough in area to be handled and installed in one piece, they can be prefabricated of sections seam welded at the factory and transported to the field site. A prior welding machine suitable for factory welding is disclosed in U.S. Pat. No. 3,402,089. However, such machine requires a solid, smooth foundation such as a factory floor and is not suitable for seam welding large panels of lining over irregular terrain in the field.

A great many of the outdoor installations are quite extensive, covering areas of several acres, so that it is literally impossible to fabricate a flexible membrane liner as a one-piece liner at the factory and then transport and install it in the field. Most such applications require panels of not over 70 feet wide by 200 feet long and weighing less than 4000 pounds to be prefabricated in a factory environment, and the individual panels are then unrolled and installed in the field by overlapping and seaming their edges together.

In the past, sustantially all such field seaming has been accomplished by the use of solvents or adhesives to join the overlapping marginal portions together, as hot air or thermal seaming has been impractical, if not impossible, due to adverse field conditions such as wet, muddy, sandy or rocky soil conditions precluding the required smooth, solid backup pressure required for prior thermal seam-welding machines.

However, while solvent or adhesive systems have been, to some extent, satisfactory for the containment of water, they are not satisfactory or desirable for the containment of chemicals and hazardous waste materials. Solvent and adhesive seams are susceptible to defects in applicator techniques, and to environmental conditions at the time of application, such as moisture or cold temperatures. Whereas, a slight seam failure in a water containment system causing a small leak might not be critical, such a leak in a hazardous waste system is extremely critical, and consequently governmental regulatory agencies such as EPA require almost failsafe seam conditions.

Moreover, solvent and adhesive seams are subject to attack not only by the chemicals in the liner itself, but also to microbiological organisms which actually feed on the adhesive material. Hence, even if the seam is substantially perfect when installed, over a period of time it can lose its bonding strength and result in a seam failure.

There is a strong need and a strong desire by private contractors and by government agencies for the production of a thermal seam in the field comparable to a factory thermal seam, as it is well recognized that such a seam is far superior for all purposes to a solvent or adhesive seam.

DISCLOSURE OF INVENTION

The novel and improved seam-welding machine comprising the present invention is adapted to produce thermally welded seams of highest quality in the field comparable to factory thermally welded seams regardless of adverse weather and terrain conditions, by lifting adjoining panels of the lining material off the ground and providing its own necessary hot air and pressure conditions for seam welding independently of the underlying ground surface.

It is an object of the present invention to provide an improved thermal seam welding machine for joining large panels of thermoplastic coated fabric in the field over uneven or adverse terrain surfaces.

Another object is to provide an improved thermal seam welding machine capable of producing high quality seam welds in the field which are resistant to chemicals and microbiological organisms.

A further object is to provide an improved seam welding machine capable of producing high quality seam welds in the field under adverse weather conditions and without the use of solvents or adhesives.

These and other objects are accomplished by the improvements comprising the present invention, a preferred embodiment of which is shown by way of example in the accompanying drawings as embodying the best known mode of carrying out the invention. Various modifications and changes in details of construction are comprehended within the scope of the appended claims.

PREFERRED EMBODIMENT FOR CARRYING OUT THE INVENTION

Figure 1:
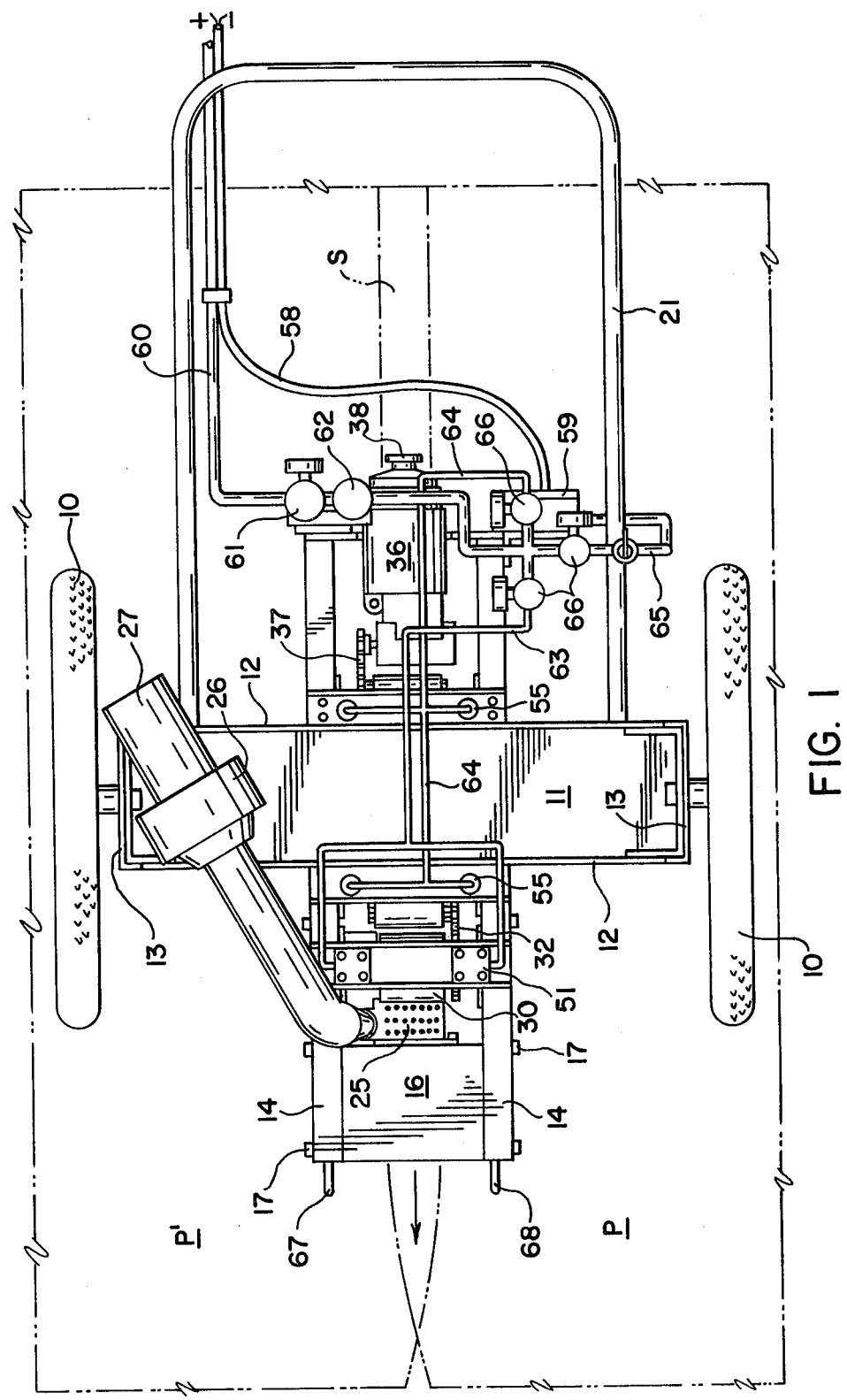
FIG. 1 is a top plan view of a preferred embodiment of the improved seam welder comprising the present invention.

As shown in FIG. 1, the improved seam welder is rollably supported on two laterally opposite wheels 10, journaled in the ends of a transverse upper frame 11, preferably having upstanding side flanges 12 and end flanges 13. The upper frame 11 is supported on a lower frame assembly which comprises two laterally spaced upper longitudinal tubular frame members 14 and two laterally spaced lower longitudinal tubular frame members 15, the members 14 being secured to the underside of the upper frame 11.

Figure 3:
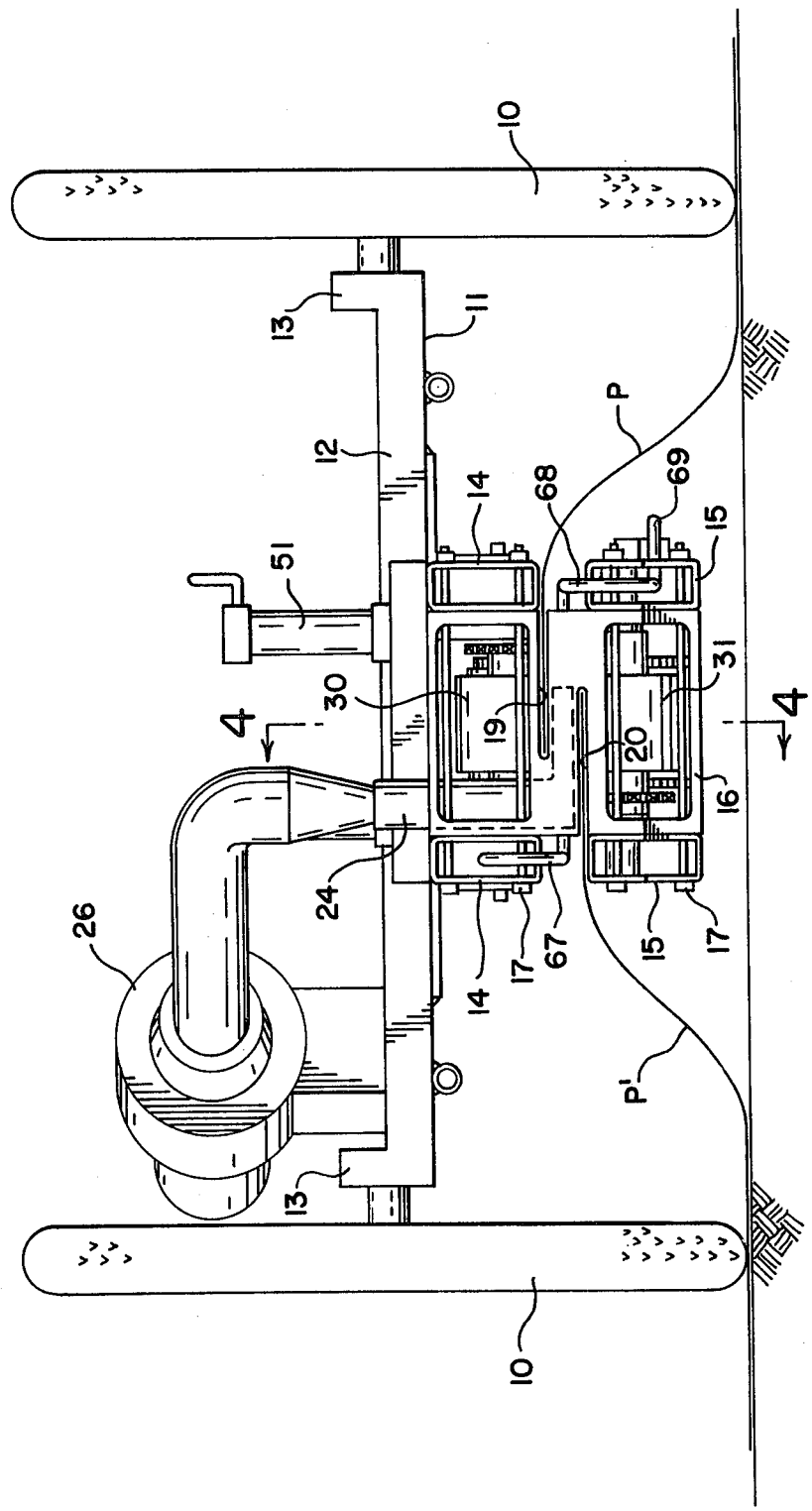
FIG. 3 is an elevation of the front end thereof.
Figure 5:
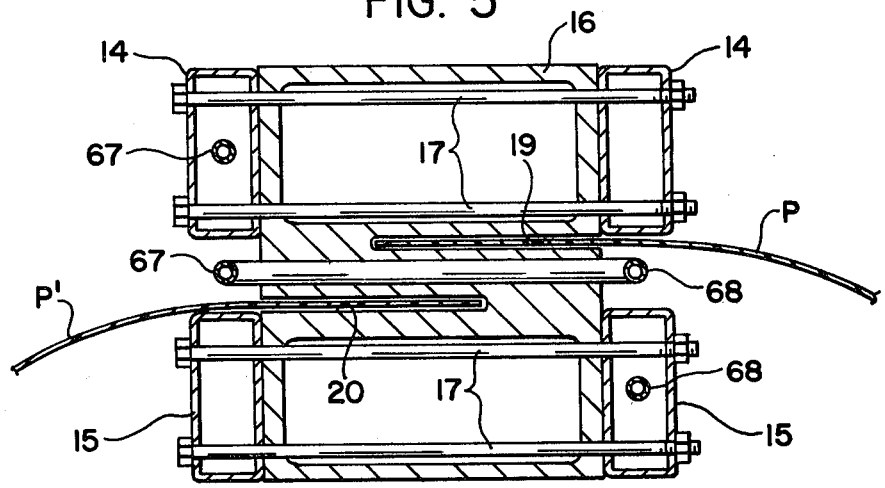
FIG. 5 is a cross-sectional view as on line 5—5 of FIG. 4.
Figure 6:
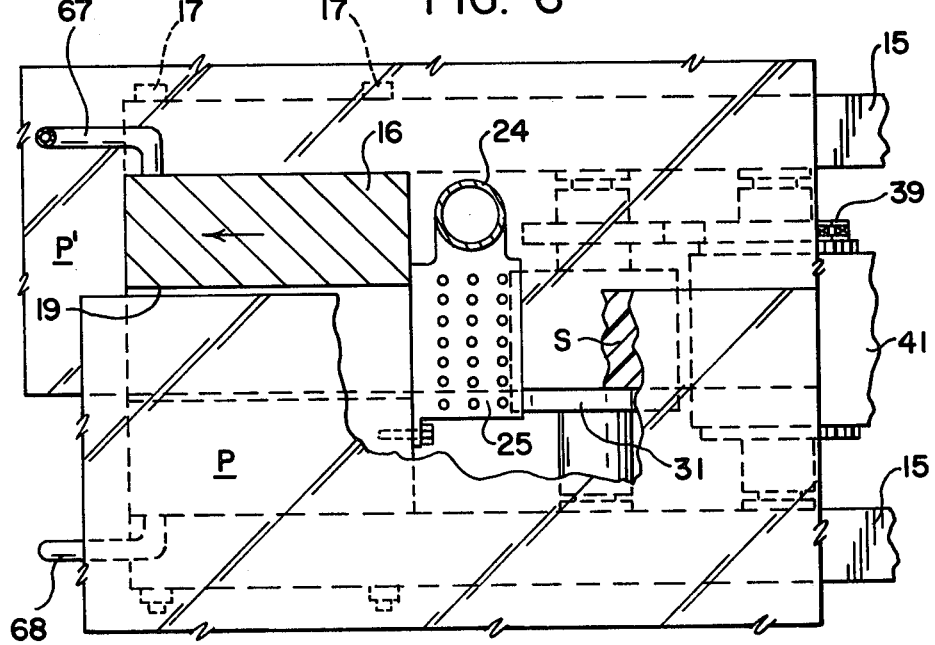
FIG. 6 is a plan sectional view on line 6—6 of FIG. 4, parts being broken away and in section.

At the head or front end of the lower frame assembly is a block or guiding head 16 between the inner surfaces of the tubular frame members 14 and 15, and it is secured thereto by transverse bolts 17, as best seen in FIG. 5. Viewed from the front end as in FIGS. 3 and 5, the block 16 has a horizontal upper slot 19 extending laterally inward from the right substantially parallel to the bottoms of upper tubes 14 and a horizontal lower slot 20 extending laterally inward from the left substantially parallel to the tops of the lower tubes 15.

The slots 19 and 20 extend past the longitudinal centerline of the block 16 and overlap each other a predetermined amount. The horizontal center plane of the block is midway between the slots 19 and 20. Viewed from the front end the positions of the slots 19 and 20 give the block substantially an S-shape in appearance. Preferably, the block is hollow above the slot 19 and below the slot 20 to save weight and material. A U-shaped handle 21 is preferably secured to the transverse upper frame 11 and extends rearwardly and inclines upwardly therefrom.

The slots 19 and 20 provide guides for the marginal edges of two side-by-side thermoplastic-coated fabric panels P and P' to guide them in overlapping relation to a nip area at the rear side of the block 16, where hot air is directed through a welding nozzle 24 and tip 25 between the overlapping marginal edges, thereby rendering the thermoplastic coatings substantially molten so that when pressed together they become welded. Hot air is delivered from the hot air gun 26 supplied with incoming air through conduit 27. The panels P and P' are preferably fabric coated with a special vinyl composition in which the plasticizer is substantially inhibited against migration under adverse weather conditions and over long periods of time.

Immediately following the nip area the overlapping edge portions of panels P and P' are pressed together between upper pressure roll 30 and lower pressure roll 31. Roll 30 is driven through a sprocket chain 32 by a front drive roll 33 which is connected by a driven timing belt 34 to a rear drive roll 35. The timing belt 34 and roll 35 are driven by a governed speed electric motor 36 through a sprocket chain 37. The motor 36 is mounted on rear extensions of the upper tubular frame members 14 and has a speed control knob 38.

The lower pressure roll 31 is driven through a sprocket chain 39 by a front drive roll 40 which is connected by a driven timing belt 41 to a rear drive roll 42. Idler sprockets (not shown) may be provided to engage and tension the sprocket drive chains 32 and 39 in a wellknown manner. The timing belt 41 and roll 42 are driven by an air powered gear motor 43 through sprocket chains 44 and 45 and reduction gear 46 which increases the effective speed of the gear motor causing it to develop increased torque on the timing belt 41. The motor 43 is mounted on a wall of one of the lower tubular frame members 15.

Figure 7:
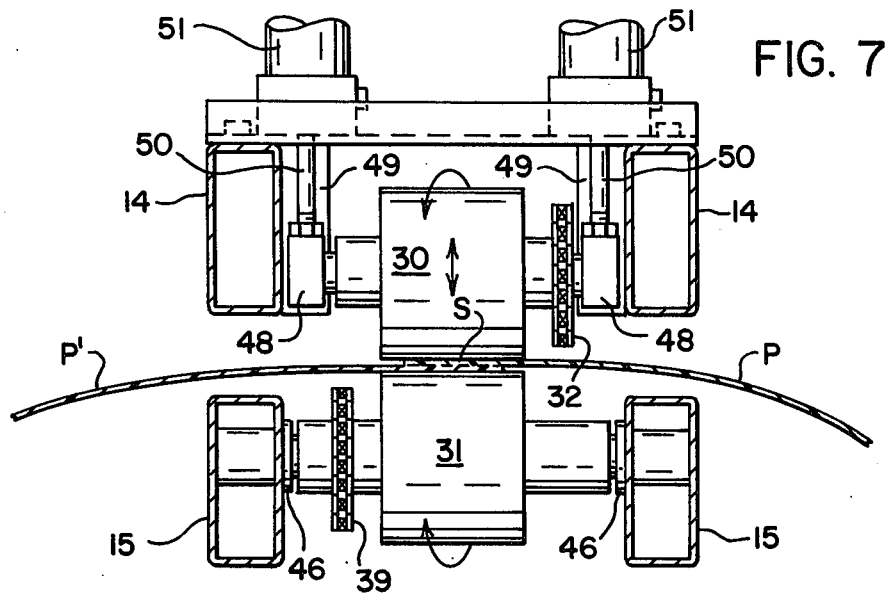
FIG. 7 is a cross-sectional view on line 7—7 of FIG. 4.
Figure 8:
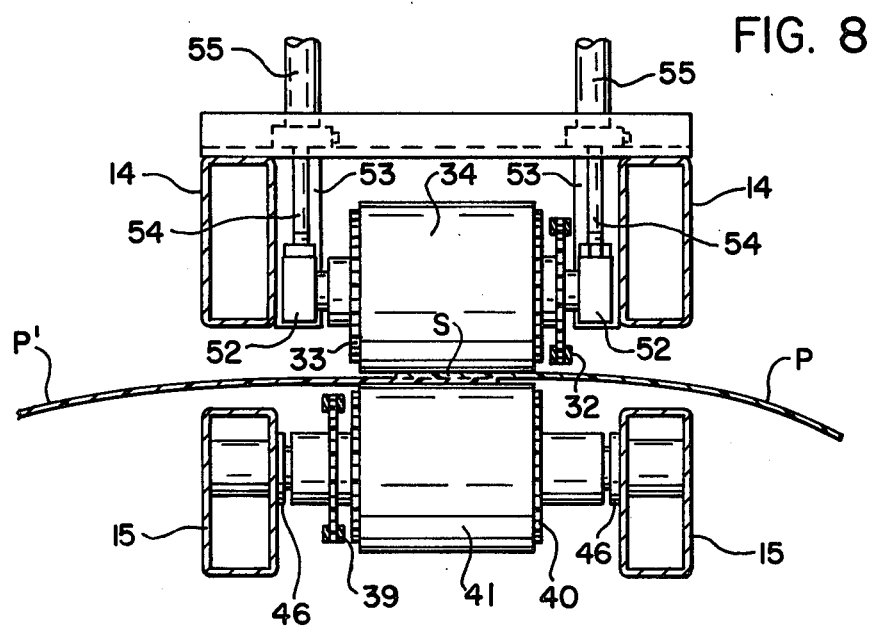
FIG. 8 is a cross-sectional view on line 8—8 of FIG. 5.

The shaft of the upper pressure roll 30 is journaled in blocks 48 which are movable in vertical channels 49 secured to upper tubular frame members 14 (FIG. 7), and the blocks are mounted on piston rods 50 yieldingly urged downwardly by pneumatic cylinders 51 to load the roll 30 downwardly against the fabric. Similarly, the upper drive rolls 33 and 34 are journaled in blocks 52 movable in vertical channels 53 secured to upper frame members 14 (FIG. 8), and the blocks are mounted on piston rods 54 yieldingly urged downwardly by smaller pneumatic cylinders 55 to load the rolls 33 and 35 downwardly against the fabric. The shafts of the lower rolls 31, 40 and 42 are journaled in bearings 46 which are fixedly mounted in tubular frame members 15.

Figure 2:
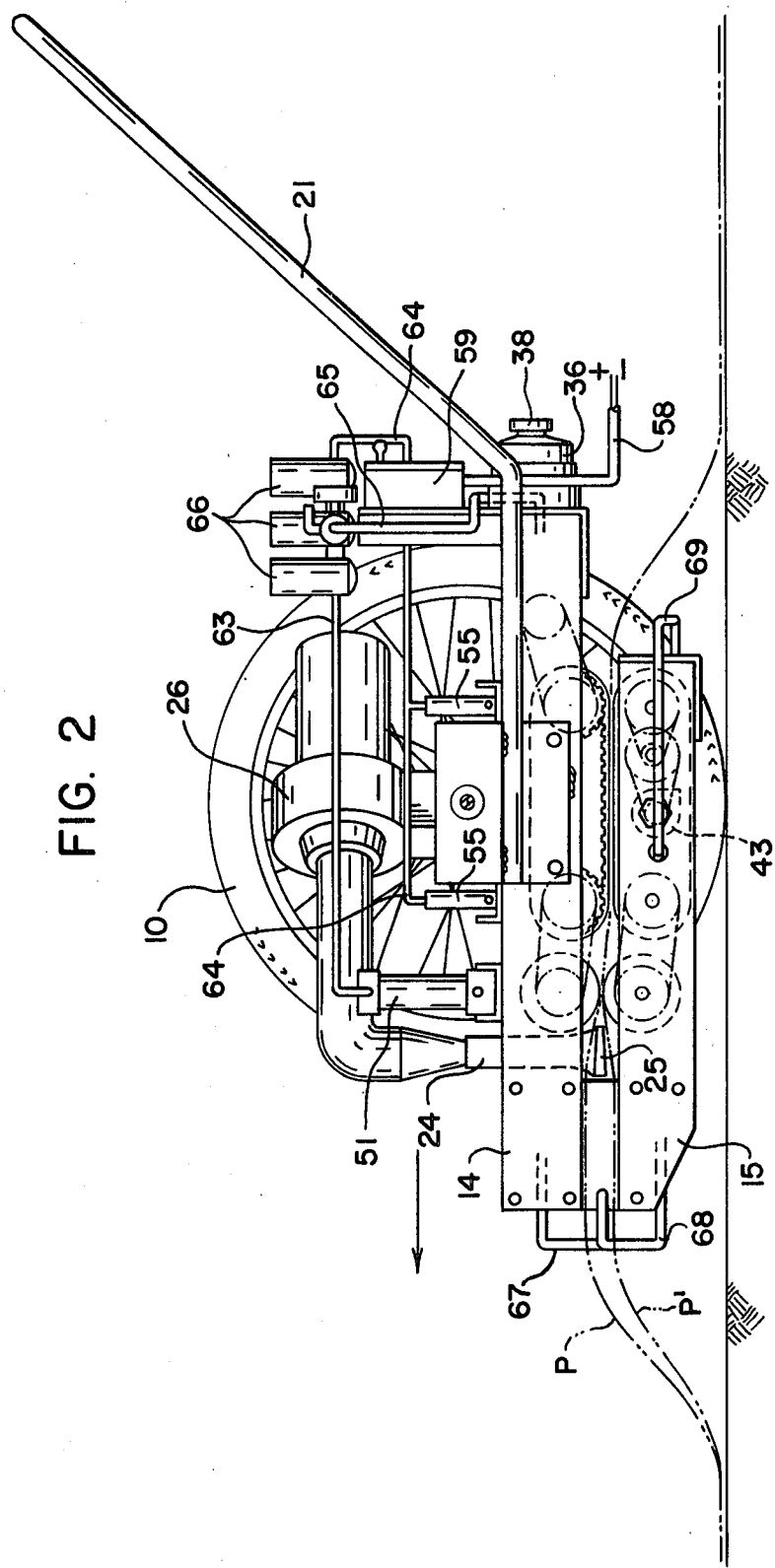
FIG. 2 is a side elevation thereof.
Figure 4:
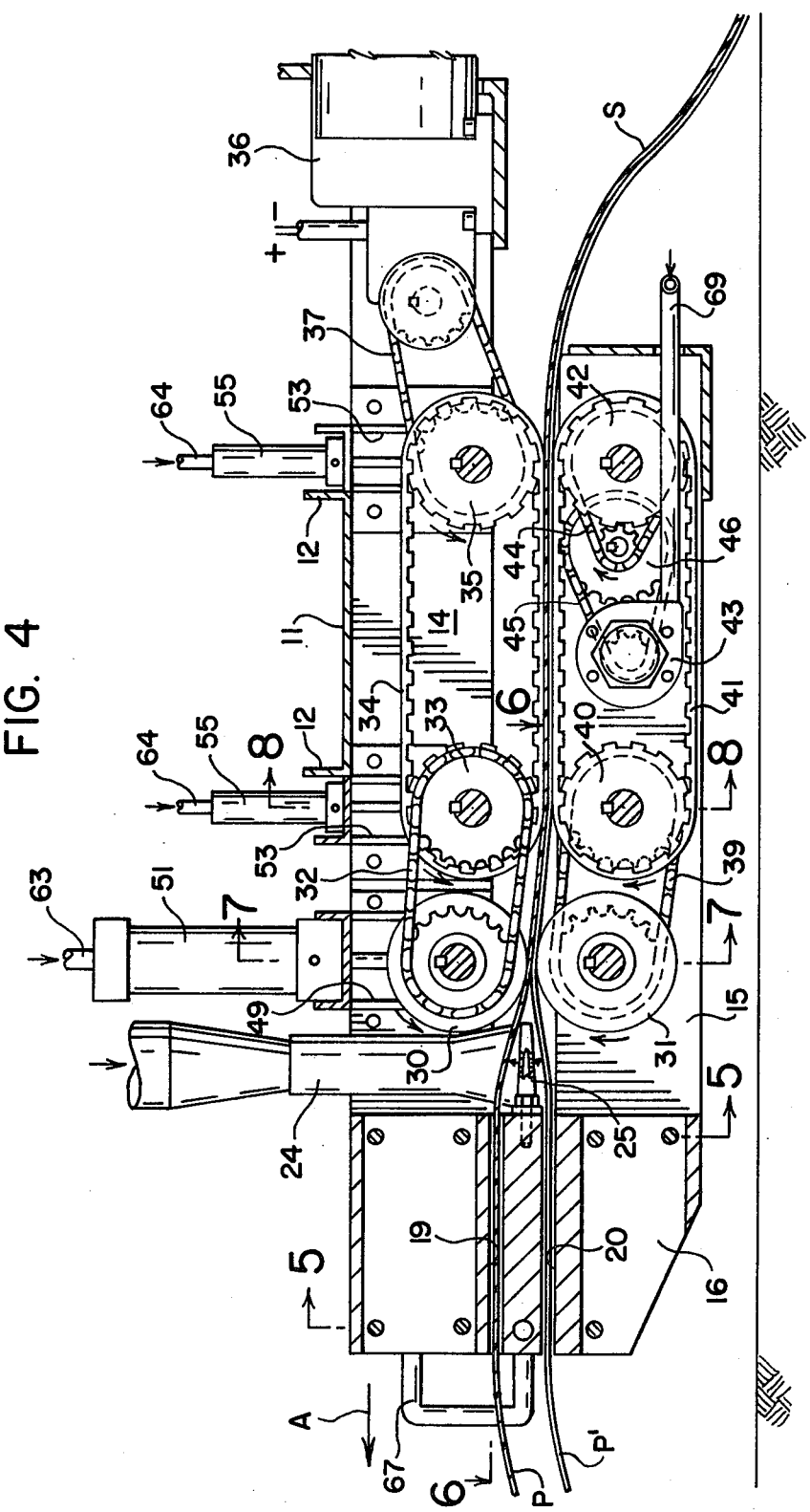
FIG. 4 is a longitudinal sectional view on line 4—4 of FIG. 3, with distant parts removed.

Referring to FIGS. 1 and 2, a cable 58 conducts electric current from a power source to a junction box 59 from which current is supplied to electric motor 36 and to the heating elements in hot air gun 26 by conventional wiring (not shown). Air is conducted from a compressor (not shown) by a conduit 60 through an air regulator 61 and oiler 62 to a junction with three branch conduits 63, 64 and 65, each having air regulators 66 therein. The conduit 63 supplies air to the cylinders 51 and conduit 64 supplies air to the cylinders 55. The conduit 65 supplies air to the gear motor 43 through devious interconnected conduits 67, 68 and 69 (FIGS. 3–5) extending forwardly through one upper tubular frame member 14, across through block 16 and then rearwardly through a laterally opposite lower tubular frame member 15.

In the operation of the machine the edge portions of two panels P and P' are passed into the slots 19 and 20 in the block 16 from which their marginal edges emerge in overlapping relation into the nip area where the tip 25 applies hot air between the overlapping marginal edges to render the coatings on their inner surfaces substantially molten. Immediately following the nip area the overlapping portions are pressed and welded together between pressure rolls 30 and 31, and then passed between the timing belts 34 and 41 connecting the rolls 33 and 35 and 40 and 42, respectively. The passage of the welded seam S through the belts assists in cooling the seam and also pulls the membrane through the pressure rolls 30 and 31 to produce a wrinkle-free seam because the outer diameter of the drive rolls is slightly greater than that of the pressure rolls 30 and 31. If the panels P and P' are stationary relative to the ground, the passage of the welded seam through the pressure rolls and timing belts causes the machine to be driven over the panels in the direction of the arrow A in FIG. 4.

The air-powered gear motor 43 is not rotated at a given speed as is the electric motor 36, but applies torque to the lower pressure roll 31 and the lower timing belt 41 so as to follow the speed of the upper pressure roll 30 and upper timing belt 34 as driven by the electric motor 36. Thus, regardless of the speed of the motor 36, the air motor causes the lower pressure roll and belt assembly to match the speed of the upper pressure roll and belt assembly, thereby insuring a smooth and wrinkle-free seam.

An important feature of the improved machine is that behind the head 16 the machine is completely open laterally or "throatless" in the plane of the seam, so that there are no guides or restrictions to restrain passage of the panels through the upper and lower pressure rolls and belt assemblies regardless of the panel widths, which would cause difficulties in passage or wrinkling at the seam. Also, the plane of the overlapping edges of the panels P and P' and the welded seam S in passing through the machine is close to the ground at all times so that the overlappings are lifted only a short distance.

The improved seam welder provides a lightweight machine adapted to produce high quality thermally welded weather and chemical-resistant seams over uneven ground in the field by lifting the marginal edge portions of adjoining membrane panels off the ground as it passes thereover, and providing its own pressure and hot air welding conditions independently of the underlying ground surface.

I claim:

1. A seam welding machine for thermally welding overlapping edge portions of coated fabric panels over uneven ground in the field, comprising a guiding head having slots which are open at their laterally outer ends and closed at their inner ends and extend inwardly from the opposite sides of the head to overlap each other past a longitudinal axis of the head for guiding overlapping edge portions of two panels into a nip area behind said head, a hot air welding tip directed into said nip area between said overlapping edge portions, upper and lower pressure rolls mounted behind said nip and upper and lower drive belts mounted behind said pressure rolls and drivably connected thereto to press said overlapping edge portions together into a seam, said machine behind said guiding head being laterally open in the plane of the said seam to allow unrestrained passage of panels of unrestricted width, and means for rollably supporting said machine with said overlapping guide slots close to the ground.

2. A seam welding machine as described in claim 1, wherein upper and lower vertically spaced frame members are mounted on the sides of said guiding head and extend rearwardly therefrom.

3. A seam welding machine as described in claim 2, wherein said pressure rolls and drive belts are mounted on and extend between said frame members.

4. A seam welding machine as described in claim 3, wherein a variable speed electric motor is mounted on said upper frame members and drivably connected to said upper drive belt.

5. A seam welding machine as described in claim 4, wherein an air powered motor is mounted on said lower frame members and drivably connected to said lower drive belt to drive it at a speed matching the speed of the upper drive belt.

6. A seam welding machine as described in claim 5, wherein means is provided to yieldingly urge the upper pressure roll downwardly against said seam.

7. A seam welding machine as described in claim 6, wherein said upper drive belt is driven by longitudinally spaced rolls, and means is provided to yieldingly urge said rolls downwardly towards said seam.

8. A seam welding machine as described in claim 7, wherein the diameters of said longitudinally spaced drive belt rolls are slightly greater than the diameter of said upper pressure rolls for pulling said seam rearwardly in wrinkle-free condition.

9. A seam welding machine as described in claim 3, wherein means is provided to yieldingly urge said upper pressure roll downwardly against said seam.

10. A seam welding machine is described in claim 9, wherein said upper drive belt is driven by longitudinally spaced rolls, and means is provided to yieldingly urge said rolls downwardly toward said seam.

11. A seam welding machine as described in claim 10, wherein the diameters of said longitudinally spaced drive belt rolls are slightly greater than the diameter of said upper pressure roll for pulling said seam rearwardly in a wrinkle-free condition.

12. A seam welding machine for thermally welding overlapping edge portions of coated fabric panels, comprising a guiding head having slots which are open at their laterally outer ends and closed at their inner ends and extend inwardly from the opposite sides of the head to overlap each other past a longitudinal axis of the head for guiding overlapping edge portions of two panels into a nip area, a hot air welding tip directed into said nip area, upper and lower pressure rolls mounted behind said nip area and upper and lower drive belts mounted behind said pressure rolls and drivably connected thereto to press said overlapping edge portions together into a seam, said machine behind said guiding head being laterally open in the plane of the said seam to allow unrestrained passage of panels of unrestricted width, and means for rollably supporting said machine with said overlapping guide slots close to the ground, and further comprising a variable speed motor for driving the upper drive belt and pressure roll, and a torque motor for driving the lower drive belt and pressure roll at a following speed matching the speed of the upper drive belt and pressure roll.

13. A seam welding machine as described in claim 12, wherein the variable speed motor is an electric motor and the torque motor is an air powered motor.

14. A seam welding machine as described in claim 13, wherein means is provided to yieldingly urge the upper pressure roll downwardly against the seam.

15. A seam welding machine as described in claim 14, wherein said upper drive belt is driven by longitudinally spaced rolls, and means is provided to yieldingly urge said rolls downwardly toward the seam.

* * * * *